(12) United States Patent
Arlt et al.

(10) Patent No.: US 8,555,741 B2
(45) Date of Patent: Oct. 15, 2013

(54) POWER STEERING APPARATUS WITH ADJUSTMENT DEVICE

(75) Inventors: George E. Arlt, Midland, MI (US); Michael L. Arrand, Davison, MI (US); Dominique Fanelli, Bouffemont (FR); Mohammed Rhezrani, Romainville (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1328 days.

(21) Appl. No.: 11/409,111

(22) Filed: Apr. 21, 2006

(65) Prior Publication Data
US 2007/0000341 A1 Jan. 4, 2007

Related U.S. Application Data

(60) Provisional application No. 60/695,494, filed on Jun. 30, 2005.

(51) Int. Cl.
*F16H 35/00* (2006.01)
*F16H 1/04* (2006.01)

(52) U.S. Cl.
USPC .................................. 74/388 PS; 74/422

(58) Field of Classification Search
USPC ........ 74/388 PS, 422, 409; 384/40, 255, 447; 403/87
See application file for complete search history.

(56) References Cited

U.S. PATENT DOCUMENTS

| | | | |
|---|---|---|---|
| 1,443,685 A * | 1/1923 | Huff | 74/500 |
| 1,565,264 A * | 12/1925 | Dubi | 74/570.21 |
| 1,592,714 A | 7/1926 | Biederman et al. | |
| 1,706,809 A | 3/1929 | Osburn | |
| 1,910,300 A * | 5/1933 | Marles | 384/296 |
| 2,069,143 A * | 1/1937 | Hammond, Jr. et al. | 74/500 |
| 2,547,784 A | 4/1951 | Saives | |
| 3,054,321 A * | 9/1962 | Macchia | 411/403 |
| 3,708,216 A * | 1/1973 | Gerling | 384/312 |
| 3,753,375 A | 8/1973 | Colletti | |
| 3,820,415 A | 6/1974 | Cass | |
| 3,872,774 A * | 3/1975 | Forster et al. | 91/400 |

(Continued)

FOREIGN PATENT DOCUMENTS

| | | |
|---|---|---|
| EP | 1 046 569 | 10/2000 |
| EP | 1 067 037 | 1/2001 |

(Continued)

OTHER PUBLICATIONS

European Search Report dated Oct. 19, 2006.

*Primary Examiner* — James Pilkington
*Assistant Examiner* — Adam D Rogers
(74) *Attorney, Agent, or Firm* — Cantor Colburn LLP

(57) ABSTRACT

The invention provides for a power steering apparatus comprising of a housing that extends along a longitudinal axis. A rack is disposed within the housing and supported for movement along the longitudinal axis by a bearing. A pinion supported by the housing is in meshing engagement with the rack. The bearing disposed around the rack includes a wall of a continuous varying radial thickness that circumferentially surrounds the rack. An adjustment device supported by the housing is connected to the bearing and rotatably adjusts the bearing relative to the longitudinal axis. The continuous varying radial thickness of the wall positions the rack as the bearing is rotated by the adjustment device relative to the pinion ensuring proper meshing engagement between the rack and the pinion.

18 Claims, 14 Drawing Sheets

(56) References Cited

U.S. PATENT DOCUMENTS

| | | | |
|---|---|---|---|
| 3,908,479 A | 9/1975 | MacDuff | |
| 4,095,482 A | 6/1978 | Kirschner | |
| 4,218,933 A | 8/1980 | Allen et al. | |
| 4,570,504 A | 2/1986 | Sitta et al. | |
| 4,572,024 A | 2/1986 | Narita | |
| 4,722,029 A * | 1/1988 | Ahle et al. | 362/528 |
| 4,895,037 A | 1/1990 | Komatsu | |
| 5,070,957 A * | 12/1991 | Harkrader et al. | 180/429 |
| 5,097,718 A | 3/1992 | Sahara | |
| 5,107,406 A * | 4/1992 | Sekido et al. | 362/528 |
| 5,109,753 A * | 5/1992 | Kobayashi | 91/375 A |
| 5,216,928 A * | 6/1993 | Kodachi | 74/422 |
| 5,265,691 A | 11/1993 | Konishi et al. | |
| 5,509,186 A * | 4/1996 | Straut | 29/256 |
| 5,562,016 A * | 10/1996 | Schoffel | 91/375 A |
| 5,778,731 A | 7/1998 | Heep | |
| 5,833,347 A * | 11/1998 | Nakamura et al. | 362/507 |
| 6,247,375 B1 * | 6/2001 | Gierc et al. | 74/388 PS |
| 6,418,808 B1 | 7/2002 | Kishizawa | |
| 6,435,050 B1 | 8/2002 | Tanke, II et al. | |
| 6,439,337 B1 | 8/2002 | Ballester | |
| 6,485,180 B2 * | 11/2002 | Mena | 384/222 |
| 7,220,056 B2 * | 5/2007 | Kubota et al. | 384/215 |
| 7,401,789 B2 * | 7/2008 | Harer et al. | 277/585 |
| 7,665,747 B2 * | 2/2010 | Arlt | 280/93.514 |
| 2003/0074996 A1 | 4/2003 | Camp | |
| 2004/0107787 A1 | 6/2004 | Petrillo et al. | |
| 2007/0209463 A1 | 9/2007 | Song et al. | |
| 2010/0061798 A1 * | 3/2010 | Unsworth et al. | 403/223 |

FOREIGN PATENT DOCUMENTS

| | | |
|---|---|---|
| GB | 655 130 | 7/1951 |
| GB | 655130 * | 7/1951 |
| JP | 2004232788 | 8/2004 |
| WO | WO 2004/067357 | 8/2004 |

* cited by examiner

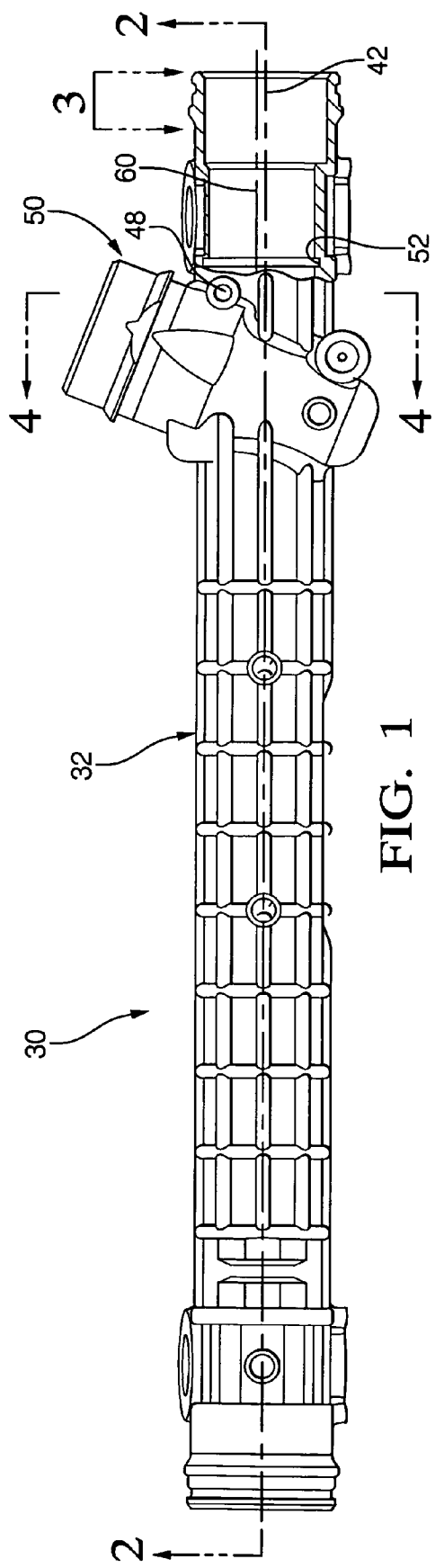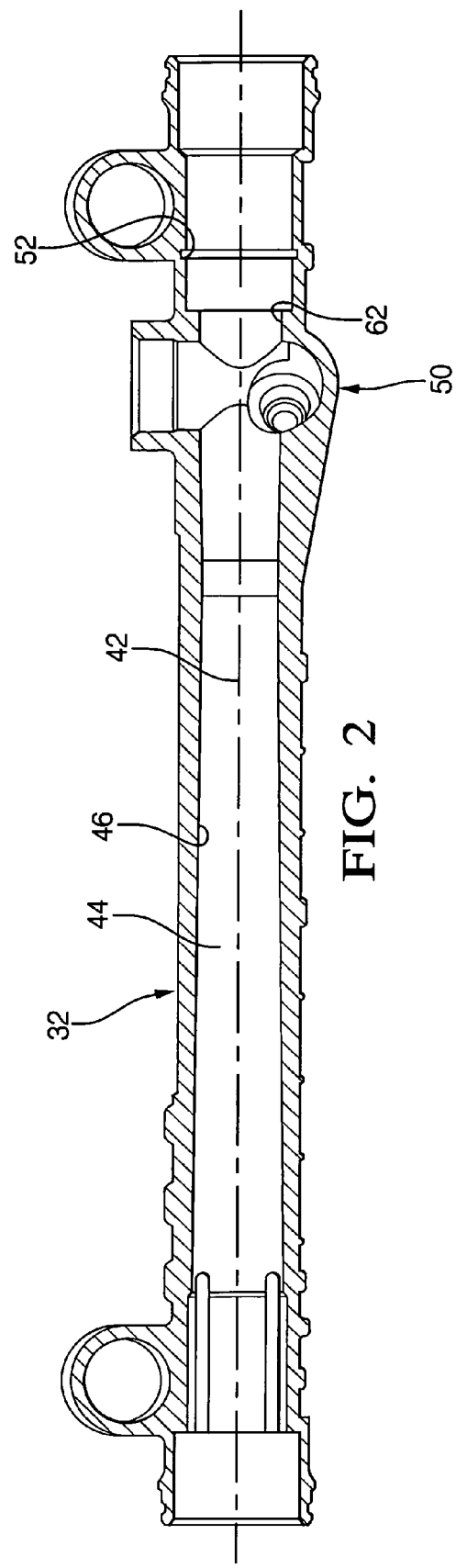

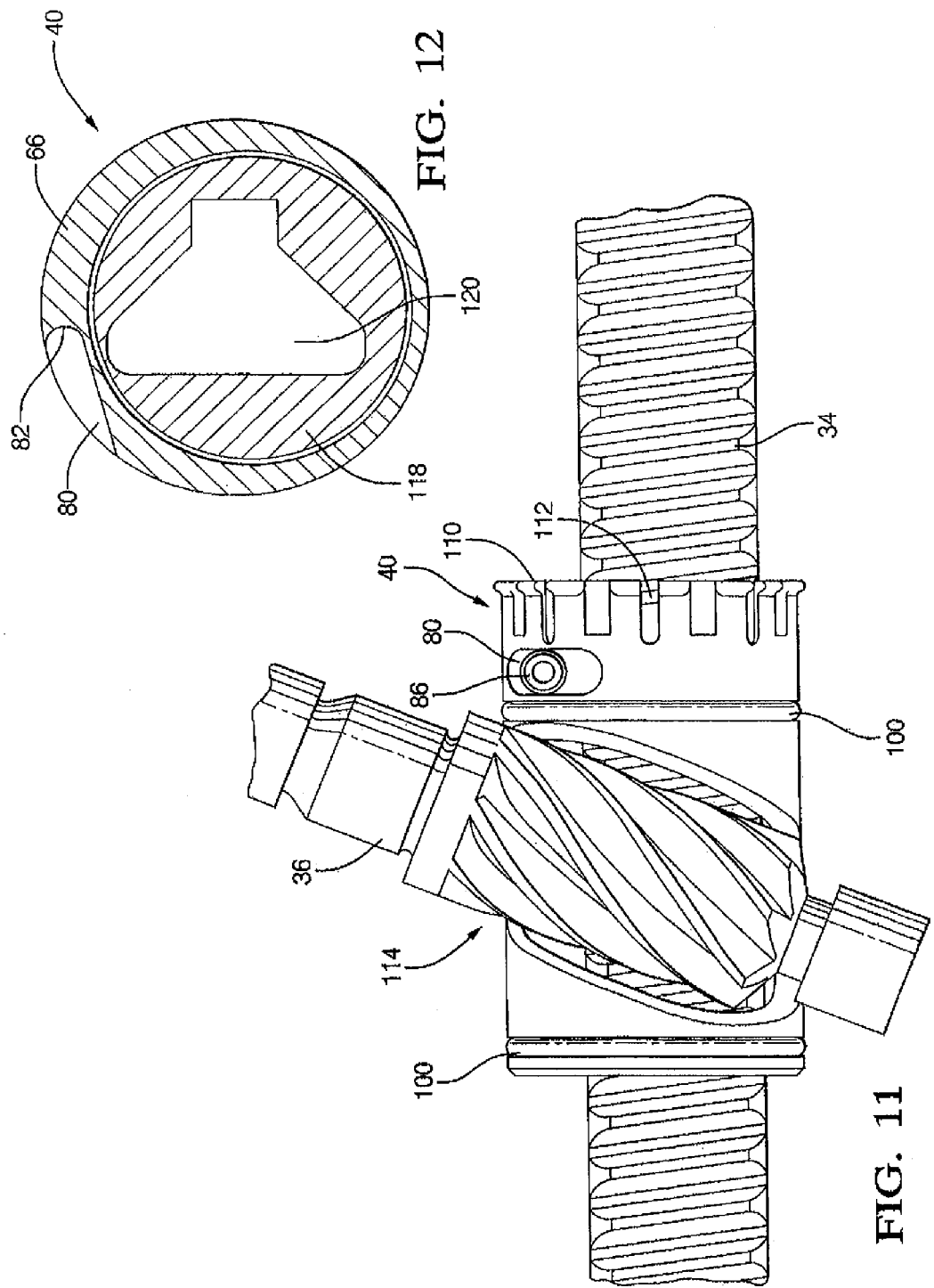

US 8,555,741 B2

POWER STEERING APPARATUS WITH ADJUSTMENT DEVICE

CROSS REFERENCE TO RELATED APPLICATION

This application claims the benefit of provisional application Ser. No. 60/695,494 filed on Jun. 30, 2005.

BACKGROUND OF THE INVENTION

1. Field of the Invention

The present invention relates to a power steering apparatus for turning steerable wheels on a vehicle with an adjustment device to adjust a rack and pinion into proper meshing engagement.

2. Description of the Prior Art

Power steering systems having a rack and a pinion are utilized in nearly all of today's vehicles to steer at least two of the wheels of a vehicle. The steering wheel of the vehicle is typically connected to a pinion gear that is in meshing engagement with a rack. The rack and pinion are supported in a housing and the rack translates the rotational movement of the pinion and steering wheel into a linear movement. The linear movement of the rack is translated to the steerable wheels of the car typically by a tie rod connected to each of the steerable wheels. In addition, power steering systems typically include an assisting force that provides a pressure or a force in proportion to the rotation of the steering wheel for assisting the linear movement of the rack. The assisting force is an additional systems that may be a hydraulic system utilizing a hydraulic piston coupled to the rack or electrical system utilizing an electric motor to supply the assisting force to the rack. In either system there is a desire to properly support and allow for adjustments to the meshing engagement between the pinion and the rack during the operational life of the power steering apparatus.

The rack can be supported in the housing by a bearing to reduce the frictional resistance on the linear movement of the rack within the housing. The bearing also supports the rack and typically is adjustable to position the rack in proper meshing engagement with the pinion. The bearing, such as that disclosed in U.S. Pat. No. 6,247,375, utilizes a yoke with a bearing surface that is eccentric to the housing to support and adjust the rack into proper meshing engagement with the pinion. The yoke is installed into a housing of the power steering assembly. Once installed, the yoke is rotated thereby adjusting the support and positioning the rack in proper meshing engagement with the pinion. The yoke is then permanently staked into position with a tool to deform the housing to support and secure the yoke in the rotated position. Since the yoke is staked into position the yoke and bearing support is not adjustable after the complete installation of the yoke into the assembly. Therefore the yoke does not allow for adjustment of the rack after the completed assembly of a vehicle, and further provides no adjustment during the operation of the power steering assembly.

Additional bearing designs such as the bearing disclosed in U.S. Pat. No. 6,435,050, utilizes a two-piece bearing design with a complex assembly involved to support the rack in the housing. The rack bearing is complex with a multiple piece bearing surface and additional bushings are needed to support the rack in proper meshing engagement with the pinion.

Therefore there exists a need to provide a power steering apparatus with a bearing having few components to support the rack in proper meshing engagement with the pinion. In addition, some type of an adjustment device would be desirable for engaging the bearing to adjust the bearing to support the rack in proper meshing engagement with the pinion.

SUMMARY OF THE INVENTION AND ADVANTAGES

The invention provides for a power steering apparatus comprising a housing that extends along a longitudinal axis. The housing further includes a chamber with an inner surface. A rack is disposed within the chamber and supported in the chamber for movement along the longitudinal axis. A pinion supported by the housing extends into the chamber for meshing with the rack. A bearing engages the inner surface of the chamber and is dispose around the rack to support the rack in the housing. The bearing includes a wall of a continuous varying radial thickness that circumferentially surrounds the rack. An adjustment device is supported by the housing and is connected to the bearing that rotatably adjusts the bearing relative to the longitudinal axis. The continuous varying radial thickness of the wall thereby positions the rack relative to the pinion ensuring proper meshing engagement between the rack and the pinion.

The invention includes a bearing and an adjustment device engaging the bearing while reducing the complexity of the assembly. The adjustment device is of an eloquent design that can be adjusted throughout the operational life of the power steering apparatus.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is an elevated view of a housing for a power steering apparatus according to a first embodiment of the invention with a partial cut-away;

FIG. 2 is a cross-sectional view taken along section lines 2-2 in FIG. 1;

FIG. 11 is a top view of a third embodiment of the bearing for supporting the rack in meshing engagement with the pinion;

FIG. 12 is a side view of a fourth embodiment of the bearing for supporting a rack having a Y-shaped configuration;

DETAILED DESCRIPTION OF THE INVENTION

Figure 3:
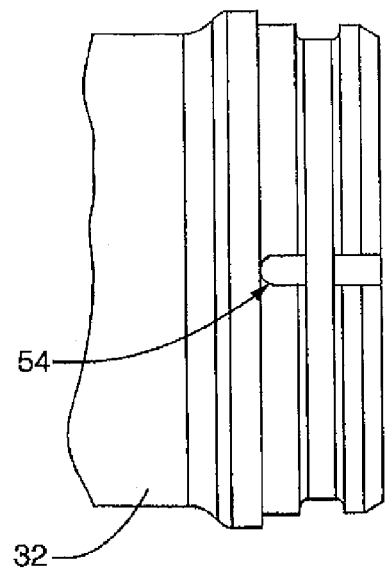
FIG. 3 is a detail view taken along perspective arrow 3 in FIG. 1.
Figure 5:
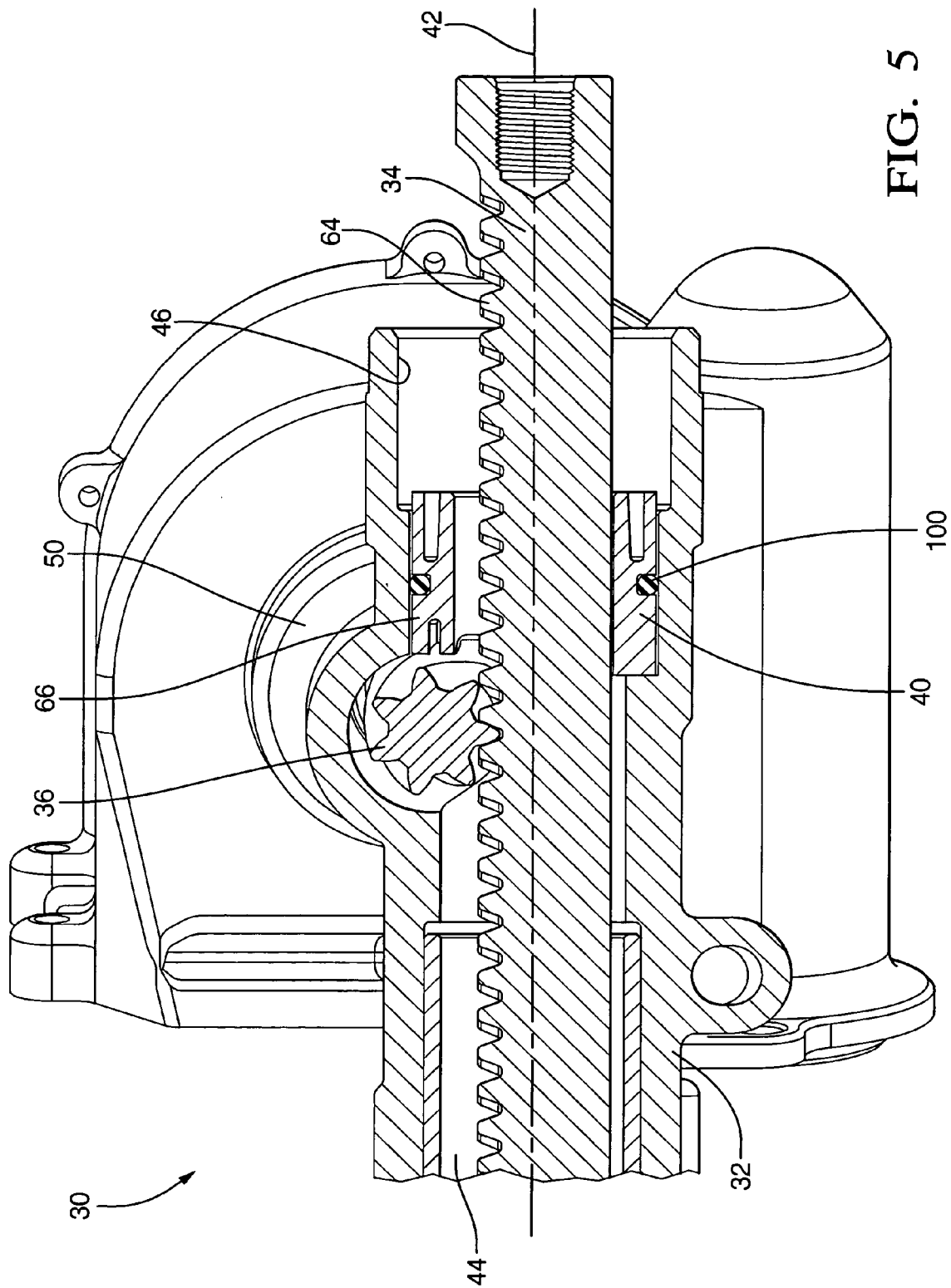
FIG. 5 is a partial sectional view of a rack and pinion of the power steering apparatus.

Referring to the Figures, wherein like numerals indicate corresponding parts throughout the several views, a power steering apparatus is shown generally at 30 in FIGS. 1 and 5. As best shown in FIGS. 1 and 2, the power steering apparatus 30 includes a housing 32 extending along a longitudinal axis 42. The housing 32 has a chamber 44 that extends along the longitudinal axis 42 and defines an inner surface 46, best shown in FIG. 2. The housing 32 includes an aperture 48 that extends into the chamber 44 for receiving an adjustment device 38 (discussed in greater detail below). The housing 32 further includes an adjoining extension 50 that is connected to the chamber 44 and extends to rotatably support a pinion 36 (also discussed in greater detail below). The adjoining extension 50 is generally transverse to the longitudinal axis 42 and the chamber 44. The inner surface 46 of the housing 32 also includes a groove 52 that extends annularly around the longitudinal axis 42 for positioning a bearing 40 as will be fully discussed below. Referring to FIG. 3, the housing 32 can optionally include a marking 54 or other feature to aid the orientation and assembly of the bearing 40 into the housing 32, the use in cooperation with the bearing 40 will be further discussed below.

Figure 4:
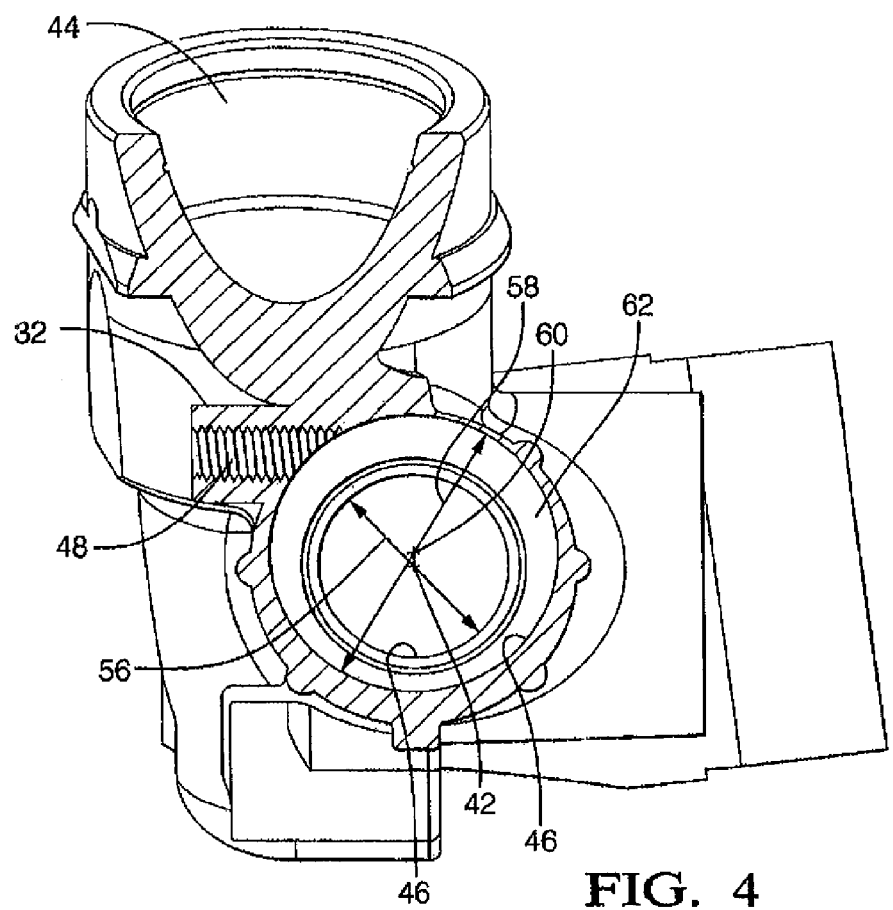
FIG. 4 is a cross-sectional view of the housing taken along section lines 4-4 in FIG. 1.

As best shown in FIG. 4, the inner surface 46 defines two diameters 56, 58. A first diameter 56 having a center on the longitudinal axis 42 and a second diameter 58 having a center on a second axis 60. The inner surface of the housing further includes a shoulder 62 between the first diameter 56 and the second diameter 58. The shoulder 62 further includes a chamfer and a lead-in to create a more gradual transition between the first diameter 56 and the shoulder 62. The first diameter 56 can be offset an amount which will vary depending on the design of the inner surface 46 and the bearing 40 to be supported within the inner surface 46. However, as is known in the art the inner surface 46 of the housing 32 can have different diameters and configurations with varying offset distances between the longitudinal axis 42 and the second axis 60. It is also appreciated that there can be no offset, which will depend on the bearing 40 design, the rack 34 configuration, and the space and size constraints on the power steering apparatus 30 within the given application. It is also appreciated by one skilled in the art that the inner surface 46 of the housing 32 can be configured to various geometries for supporting and locating the bearing 40, and the rack 34 within the housing, as will be further discussed below.

Figure 6:
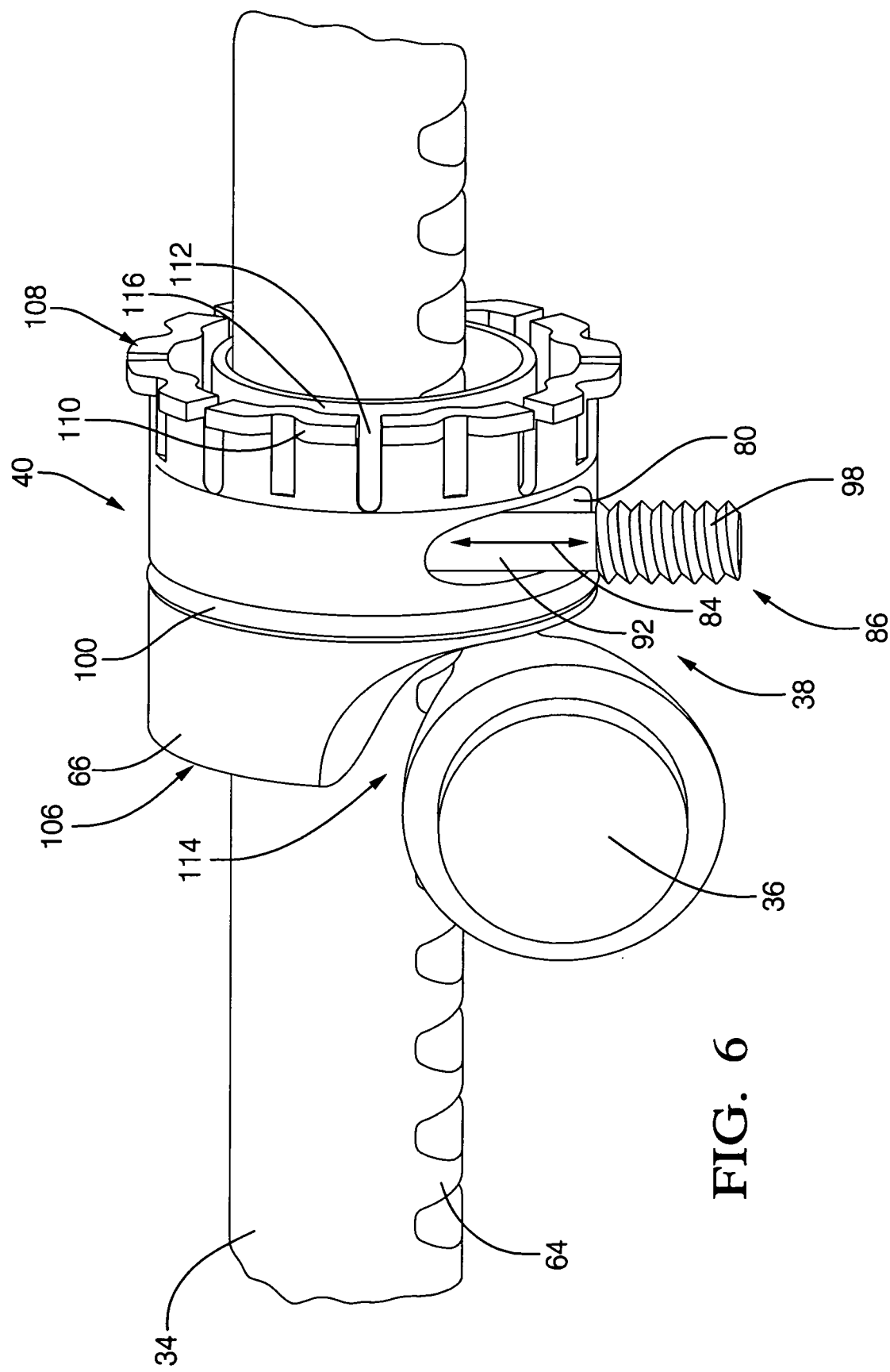
FIG. 6 is a partial perspective view of the rack supported in a bearing and in meshing engagement with the pinion.

Referring to FIGS. 5 and 6, the rack 34 is disposed within the chamber 44 of the housing 32 and moves linearly along the longitudinal axis 42 in response to rotational movement of the pinion 36 as is known in the art. The pinion 36 is rotatably supported in the adjoining extension 50 of the housing. As is known in the art the adjoining extension 50 typically will include an area for press fitting a rotational support, i.e., a roller bearing, to support the pinion 36. The rack 34 defines a plurality of teeth 64 for meshing with the pinion 36 as is well known in the art. The rack 34 translates the rotational movement of the pinion 36 to a linear movement. In a typical application, such as a passenger vehicle, the pinion 36 is connected to the steering wheel (not shown) and rotates in relationship to a movement of the steering wheel by a driver. The rack 34 translates the rotational movement of the pinion 36 into the linear movement which is connected to and moves the steerable wheels of a vehicle, typically through a tie rod engaging each of the steerable wheels. As known in the art, the power steering apparatus 30 typically includes an assisting force (not shown) to move the rack 34 within the housing 32. The assisting force is commonly created by a mechanical system such as a hydraulic, an electric or various other assisting technologies as are known in the art.

Referring to FIGS. 5, 6, 7, 8 and 9, the rack 34 is supported in the housing 32 by the bearing 40. The bearing 40 of the subject invention includes a wall 66 having a continuous varying radial thickness circumferentially surrounding the rack 34 in the housing 32. The wall of the bearing 40 has an outer face 68 and an inner face 70. The bearing 40 further provides a dampening mechanism 100 for dampening the lash movements of the rack 34 within the bearing 40 against the inner surface 46 of the housing 32. The outer face 68 provides for engagement with the dampening mechanism 100 which could include many elastomeric materials and configurations as one skilled in the art would recognize. The dampening mechanism 100 can further be defined as an o-ring that engages the outer face 68 of the bearing 40. The o-ring is a polymeric material with elastic properties and thereby provides dampening of the lash movements of the rack 34 relative to the pinion 36 and housing 32. As shown in FIG. 5 the o-ring engages into a channel in the outer face 68 and is disposed between the outer face 68 of the bearing 40 and the inner surface 46 of the housing 32.

Referring to FIG. 6, the wall 66 of the bearing 40 can optionally define a scallop 114 extending inward along the longitudinal axis 42. The scallop 114 defines a cut-out from the wall 66 of the bearing 40 allowing the bearing 40 to be designed and positioned in the chamber 44 relatively close to the pinion 36 as shown in FIG. 6. The bearing 40 being positioned near the pinion 36 allows for the bearing 40 to support the rack 34 against bending and torsional forces caused by the meshing engagement with the pinion 36. FIG. 6 shows the wall 66 of the bearing 40 with a scallop 114 which removes a portion of the wall 66 to allow the pinion 36 to engage and mesh with the rack 34. The scallop 114 therefore allows a portion of the wall 66 of bearing 40 to extend along the rack 34 opposite the pinion 36 to support the rack 34 in meshing engagement with the pinion 36. The position of the bearing 40 is important to support the opposing force caused by the meshing engagement between the pinion 36 and the rack 34. The closer the bearing 40 is to the meshing location of the pinion 36 to the rack 34 reduces a leverage force between the meshing engagement of the rack 34 and pinion 36 and the bearing 40. The reduced leverage force thereby improves the support of the rack 34 and prevents the rack 34 from bending away from and out of proper engagement with the pinion 36. In addition, the bearing 40 position being near or under the pinion 36 decrease decreases the probability of noise or vibration as a result of lash movements of the rack 34 due to high application loads on the apparatus 30.

Figure 7:
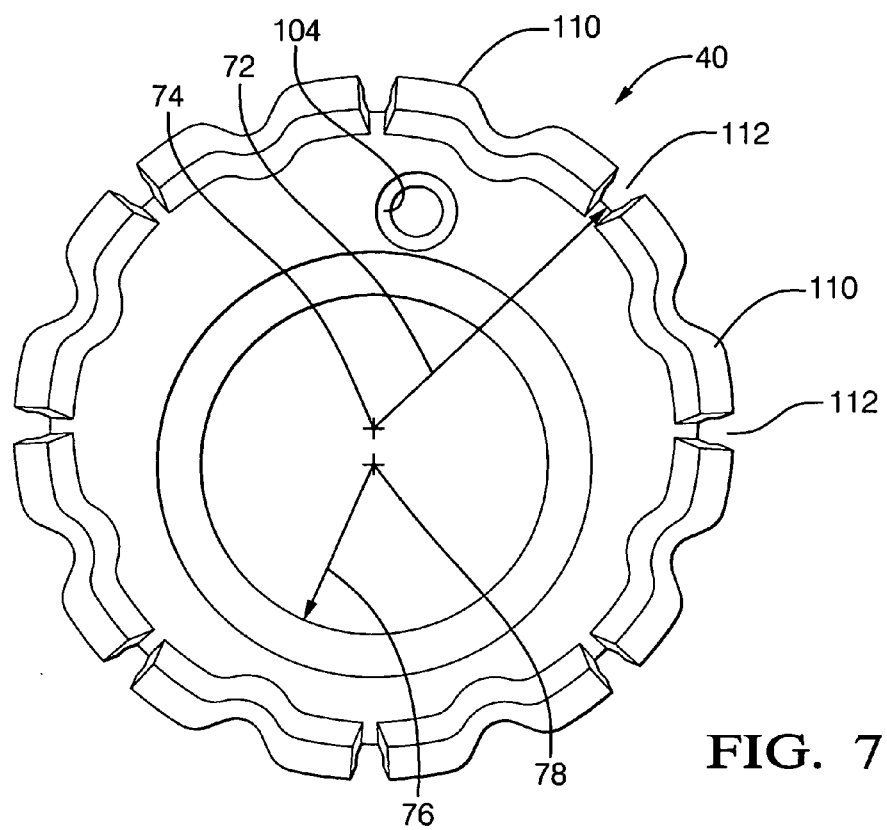
FIG. 7 is a side view of the bearing shown in FIG. 6.

The bearing 40 additionally includes features to aid in locating and orienting the bearing 40 within the chamber 44 of the housing 32 during the assembly of the apparatus 30. As shown in FIG. 7, the bearing 40 includes an orientation extension 104, which is a cylinder in this embodiment, for locating the bearing 40 relative to the housing 32. For example, the orientation extension 104 can be used to locate the top or noon position of the bearing 40 or optionally align with the marking 54 on the housing 32. The marking 54 was discussed above and is as shown in FIG. 3. The bearing 40 is preferably oriented in the chamber 44 relative to the housing 32 such that a 10 to 12 degree rotation from nominal to increase clearance and to position the rack 34 below the longitudinal axis 42. By supporting the rack 32 initially during assembly below the nominal position creates additional clearance between the rack 34 and pinion 36. The clearance is needed to allow for the pinion 36 to be installed into the apparatus 30 in a meshing engagement with the rack 34. However, one skilled in the art would recognize that there are numerous ways to orient the bearing 40 with the use of additional assembly tooling. The additional clearance is removed by an adjustment device 38 that rotates the bearing 40 to position the rack 34 in a proper meshing engagement with the pinion 36, which will be discussed fully below.

The groove 52 in the inner surface 46 of the housing 32 provides a positive location and reference location for the bearing 40 within the chamber 44 of the housing 32. The wall 66 of the bearing 40 includes a leading end 106 and a trailing end 108 that define a bearing width. The trailing end 108 of the bearing 40 includes a finger 110 biased outward from the bearing 40 for engagement into the groove 52 and provides a positive location to the bearing 40 within the chamber 44. The finger 110 removably locks the bearing 40 in engagement with the groove 52 in the chamber 44 and allows for removal of the bearing 40 if needed without damaging the housing 32 and/or the bearing 40. Optionally, the trailing end 108 can include a series of alternating fingers 110 and notches 112 circumferentially around the bearing 40, to engage the groove 52 and position the bearing 40, as shown in FIG. 7. The removable aspect of the bearing 40 is advantageous to allow for the bearing 40 to be removable from the housing 32 without damaging the inner surface 46 of the housing 32, which is an expensive component to the manufacture and damage to the inner surface 46 could lead to a scrap part or additional machining cost to refinish the inner surface 46 of the housing 32.

Additionally the trailing end 108 of the bearing 40 can further include a stop that engages with the rack 34. The stop may simply include the inner face 70 having a chamfer at a diameter that is less than an end diameter of the rack 34. There are numerous ways the bearing 40 could prevent the rack 34 from completely passing through the bearing 40, thereby creating a stop to the linear travel of the rack 34 within the housing 32. The use of the bearing 40 as a stop is particularly advantageous when the size of the housing 32 is important and to eliminate the need for additional components or additional complexity to the inner surface 46 to design in a feature to limit the travel of the rack 34 within the housing 32.

Figure 8:
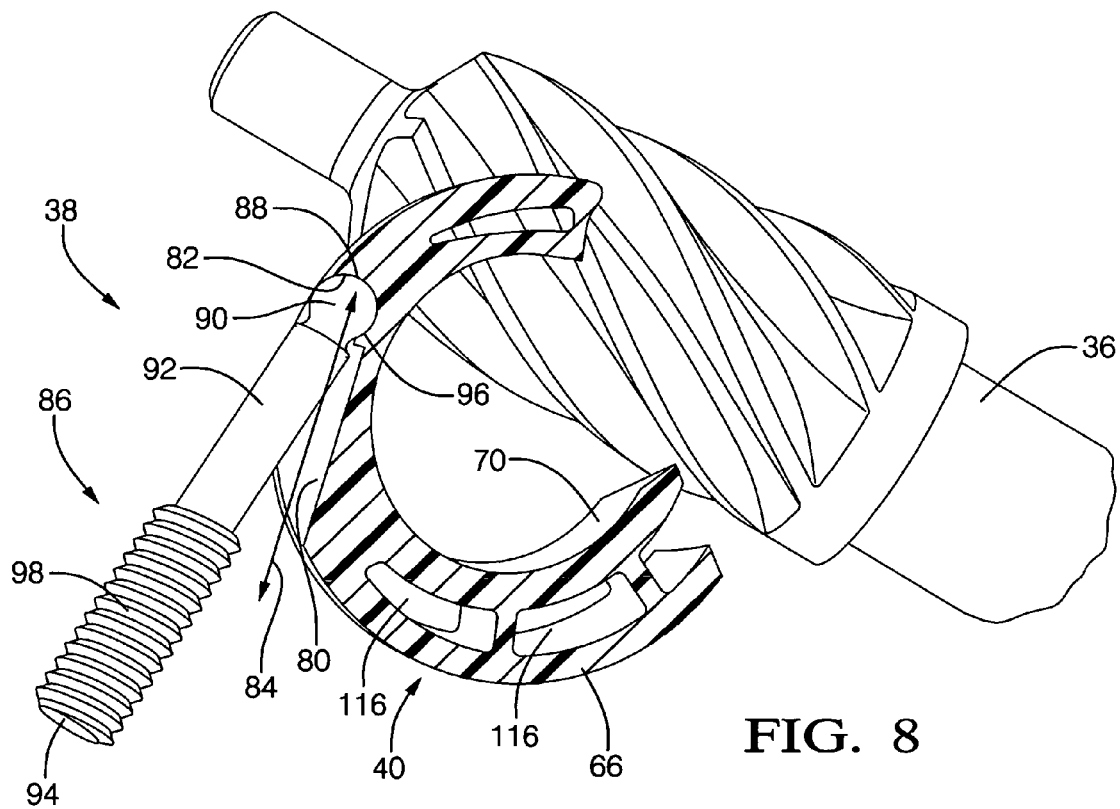
FIG. 8 is a partial cross-sectional view showing the engagement between an adjustment device and the bearing.

The wall 66 of the bearing 40 can additionally include features to improve the manufacturability the bearing 40. The wall 66 can define a cavity 116 or a series of cavities 116 that extend from the leading end 106 along the longitudinal axis 42 toward the trailing end 108 of the bearing 40. The cavity 116 provides for an even cure of the polymer material of the bearing 40 during the manufacturing of the bearing 40. FIG. 8 shows the wall 66 having a series of cavities 116. The cavities 116 increase the likelihood that the polymer material of the bearing 40 will evenly cure with little or no undulations to the inner surface 70 of the bearing 40. This is important since the inner surface 70 supports the rack 34 and undulation or imperfection to the inner surface 70 can increase wear of the bearing 40 and increase frictional resistance to the linear movement of the rack 34.

Referring to FIG. 7, the wall 66 of the bearing 40 includes the outer face 68 and inner face 70. The outer face 68 is defined by an outer radius 72. The outer face 68 is generally circular and defines an external circumference having a first center point 74. The wall 66 is further defined by the inner face 70 having an inner radius 76. The inner face 70 is generally circular and defines an internal circumference having a second center point 78. The second center point 78 is spaced a distance from the first center point 74 to define an amount of eccentricity between the outer circumference and the inner circumference which thereby defines the varying radial thickness of the wall 66. The varying radial thickness is gradual allowing for a gradual and smooth adjustment of the bearing 40 by the adjustment device 38, as discussed below.

As shown in FIGS. 4 and 7, the outer face 68 of the bearing 40 engages against the inner surface 46 where the inner surface 46 defines the second diameter 58. The outer face 68 is slightly smaller than the second diameter 58 of the inner surface 46 to allow for the bearing 40 to be rotated by the adjustment device 38 (discussed below). As mentioned above, the first diameter 56 is centered on the longitudinal axis 42 and the second diameter 58 is centered on the second axis 60. The second axis 60 is offset from the longitudinal axis 42 and the offset can vary. However, as shown, the offset is generally equal in an opposite direction to the amount of eccentricity between the first and second center points 74, 78 of the wall 66 of the bearing 40. In other words, the offset is equal and opposite to the varying radial thickness of the wall 66. The first diameter 56 of the inner surface 46 allows for clearance between the rack 34 and the housing 32 as the bearing 40 is rotated by the adjustment device 38, as will be discussed below, to move the rack 34 into proper meshing engagement with the pinion 36. The second axis 60 and thereby the second diameter 56 being offset from the longitudinal axis 42 is important for applications where the housing 32 size is limited due to space concerns and constraints within the application of the apparatus 30. The offset second axis 60 in combination with the varying radial thickness of the wall 66 of the bearing 40 allows for a smaller radial cross-section of the housing 32 that still has sufficient clearance to adjust the position of the rack 34 with the adjustment device 38, as discussed below.

Referring to FIG. 8, the bearing 40 is operatively connected to the adjustment device 38 that rotates the bearing 40 relative to the longitudinal axis 42. The varying radial thickness of the wall 66 of the bearing 40 therefore moves the rack 34 toward the pinion 36 as the radial thickness of the wall 66 supporting the rack 34 increases and away from the pinion 36 as the radial thickness of the wall 66 supporting the rack 34 decreases. The rack 34 is moved relative to the pinion 36 and housing 32 by the adjustment device 38 rotating the bearing 40 thereby the varying the radial thickness of the wall 66 supporting the rack 34 which positions the rack 34 into proper meshing engagement with the pinion 36. Therefore, the bearing 40 adjusts the rack 34 with a gradual movement relative to longitudinal axis 42 as the bearing 40 is rotated by the adjustment device 38.

The varying radial thickness of the wall 66 is at a minimum at a radial location where the internal circumference is closest to the external circumference.

The wall 66 of the bearing 40 defines a hole 80 that extends to a distal end, and the distal end further defines a seat 82. The adjustment device 38 couples with the seat 82 to allow for a push and pull rotation of the bearing 40 relative to the movement of the adjustment device 38 as shown by a directional arrow 84. The hole 80 has an elliptical shape with the diameter tapering in a generally conical fashion into a bulb shaped seat 82. The elliptical shape and conical geometry of the hole 80 allows for the adjustment device 38 to pivot in the seat 82. The geometry of the hole 80 is particularly important to allow the adjustment device 38 to pivot as the bearing 40 rotates about the longitudinal axis 42 during the adjustment of the bearing 40. In particular, referring to FIG. 8, the bulb shaped seat 82 has a partial socket portion 96, and the ball shaped portion 90 of the adjustment device 38 is coupled to the seat 82 in a ball and socket configuration.

Figure 9:
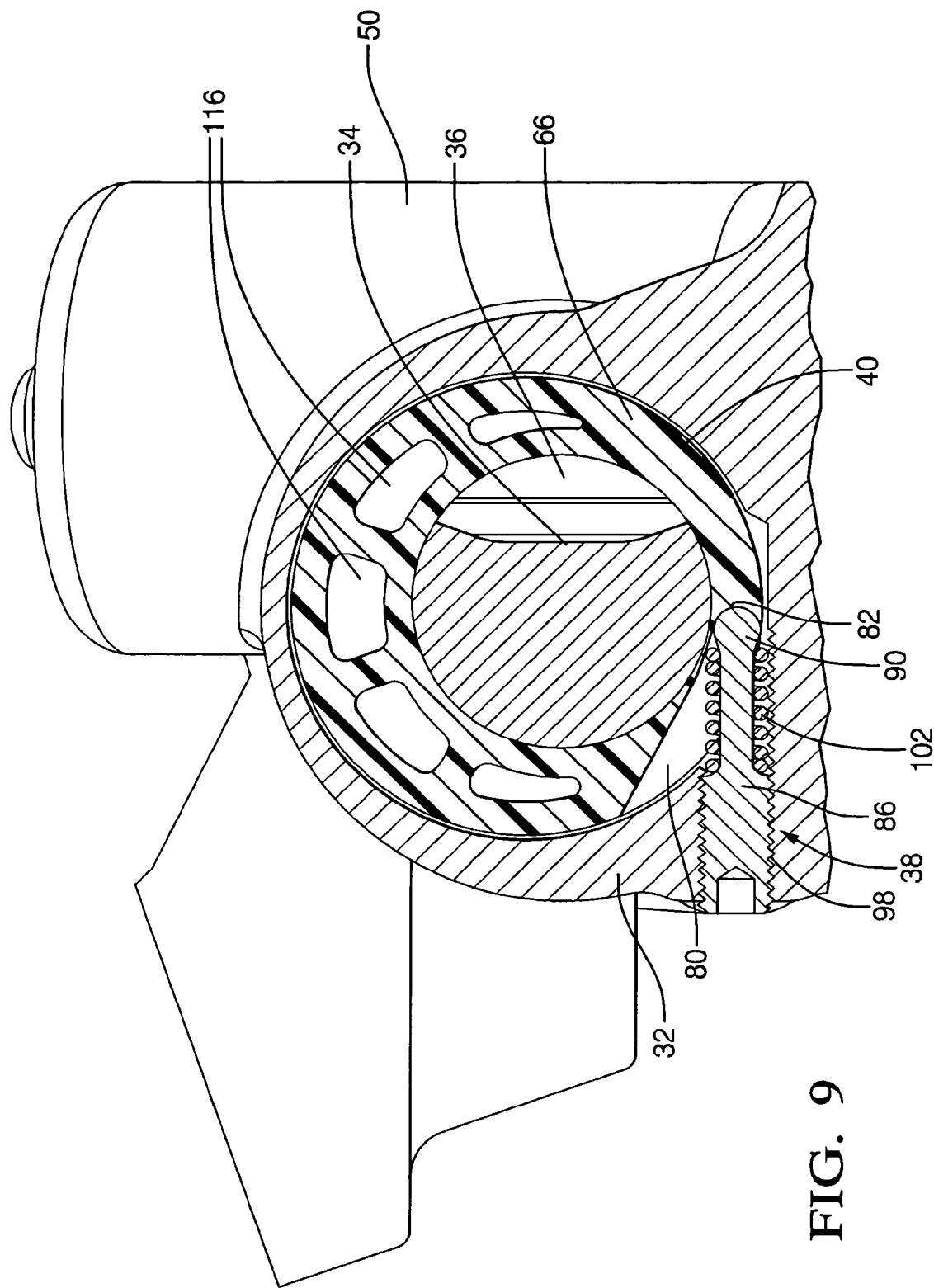
FIG. 9 is a partial cross-sectional view showing the bearing in the housing and the engagement between the adjustment device, the bearing, and the rack.

The adjustment device 38 preferably includes a fastener 86, or set screw, for coupling with the seat 82 of the bearing 40. The fastener 86 includes a first end 88 that defines a bulbous portion 90 and a shaft 92 that extends from the first end 88 to a second end 94. The bulbous portion 90 of the fastener 86 engages with the seat 82 of the bearing 40. The fastener 86 pivots in the seat 82 of the bearing 40 as the bearing 40 is rotated about the longitudinal axis 42 during the adjustment of the bearing 40. The seat 82 of the bearing 40 can optionally include an annular projection 96 for the bulbous portion 90 of the fastener 86 to engage creating a coupling engagement between the fastener 86 and the bearing 40. The annular projection 96 aids to provide a secure engagement so the bearing 40 can be rotated in two directions without the fastener 86 becoming disengaged from the seat 82 of the bearing 40. Therefore the bearing 40 is rotated in one direction with a push force when the fastener 86 is driven into the seat 82 and the opposite direction with a pull force when the fastener 86 is backed away from the seat 82. The second end 94 of the fastener 86 defines a threaded portion 98 for engagement with the aperture 48 of the housing 32 to allow the tightening of the fastener 86 to push the bearing 40 and loosening of the fastener 86 to pull the bearing 40. The bearing 40 is rotated relative to the longitudinal axis 42 as the fastener 86 pivots in the seat 82 within the hole 80. FIG. 9 illustrates a cross-sectional view of the housing 32 with the adjustment device 38, including the fastener 86, and the bearing 40 to show the engagement between the components of the apparatus 30. It should be appreciated that the adjustment device 38 could be of any suitable design.

Optionally, the adjustment device 38 can further include a coil spring 102, as shown in FIG. 9. The coil spring 102 is disposed around the shaft 92 of the fastener 86 for biasing between the bearing 40 and the housing 32. The biasing by the coil spring 102 provides additional dampening for lash movements of the rack 34 relative to the pinion 36. In addition, the coil spring 102 provides a force that can further rotate the bearing 40 to maintain proper meshing engagement between the rack 34 and the pinion 36. The rotation of the bearing 40 by the coil spring 102 effectively provides operational adjustments to the bearing 40 as needed to compensate for additional clearance caused by wear on the bearing 40 over time with the operation of the power steering apparatus 30.

The dampening mechanism 100 and the outer face 68 of the bearing 40 provide a friction force against the inner surface 46 that locks the bearing 40 in position. The friction force provides a virtual lock of the bearing 40 in position and does not allow the bearing 40 to rotate under high application loads to compress the coil spring 102, thereby rotating the bearing 40. Therefore, the adjustment of the bearing 40 by the coil spring 102 is effective in rotating the bearing 40 during the operation of the apparatus 30, and the friction force caused by the interface between the outer face 68 and the dampening mechanism 100 with the inner surface 46 maintains the bearing 40 in position to prevent compression of the coil spring 102. However, one skilled in the art would recognize that the coil spring 102 is removable and only an additional option for providing a way to further dampen the lash movement in the apparatus 30 while providing an operational and continuous adjustment of the bearing 40 to compensate additional clearance caused by wear on the bearing 40 due to the operation of the apparatus 30.

Figure 10:
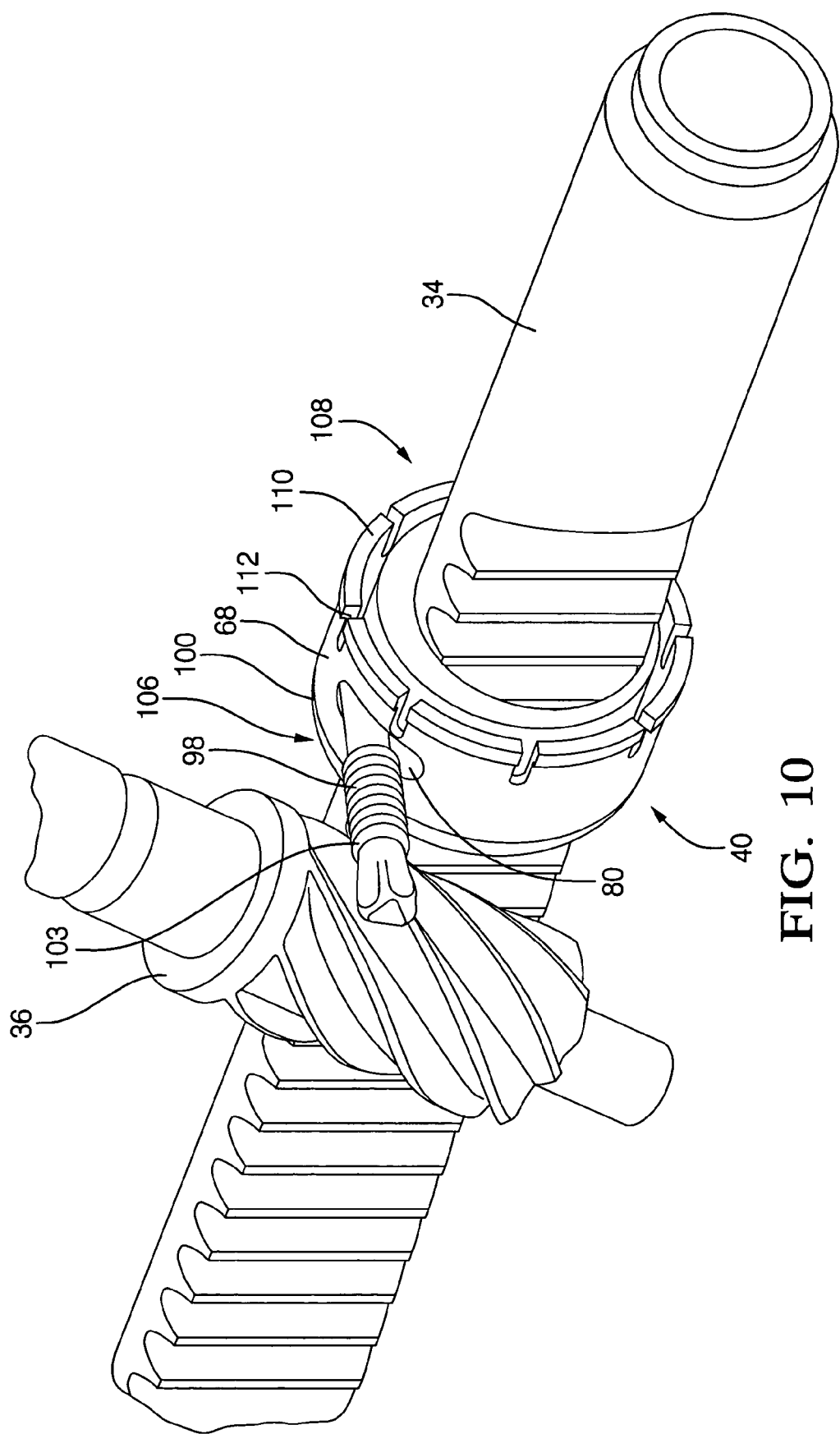
FIG. 10 is a perspective view of a second embodiment of the bearing for supporting the rack in meshing engagement with the pinion.
Figure 13:
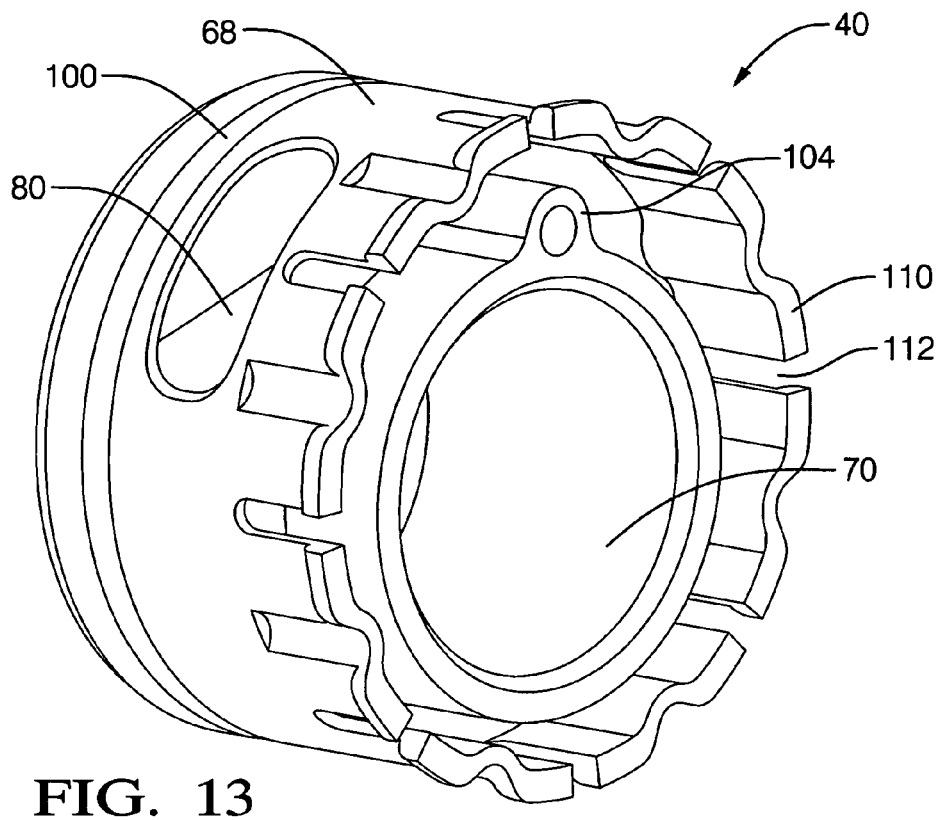
FIG. 13 is a perspective view of a fifth embodiment of the bearing for supporting the rack in meshing engagement with the pinion.
Figure 14:
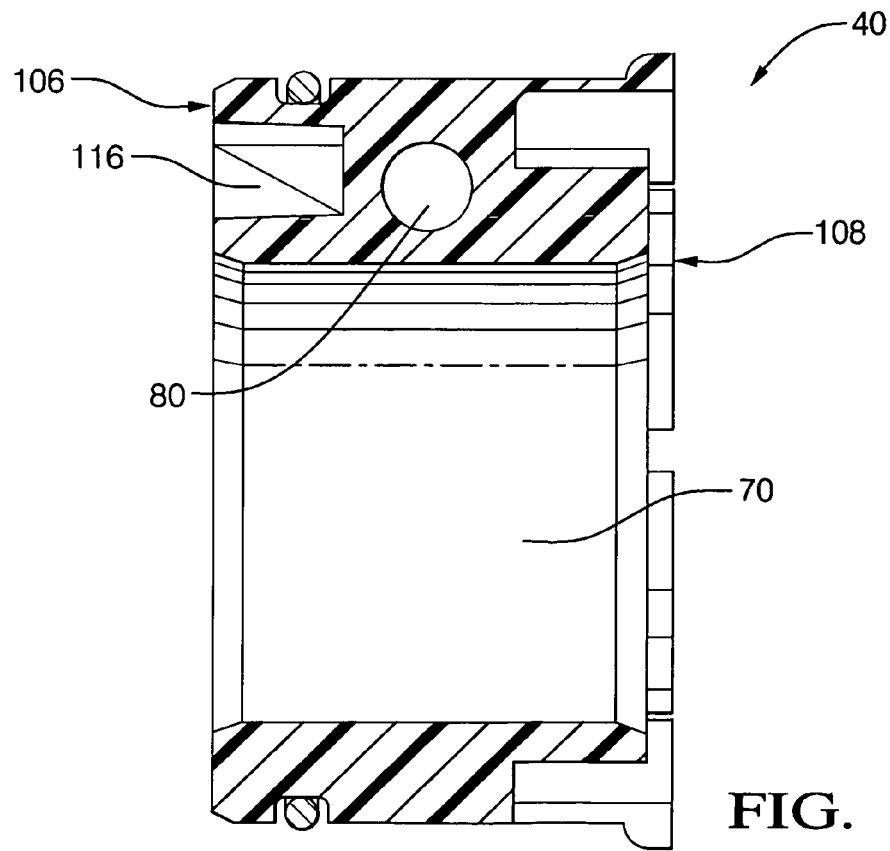
FIG. 14 is a cross-sectional view of the bearing of the fifth embodiment.
Figure 15:
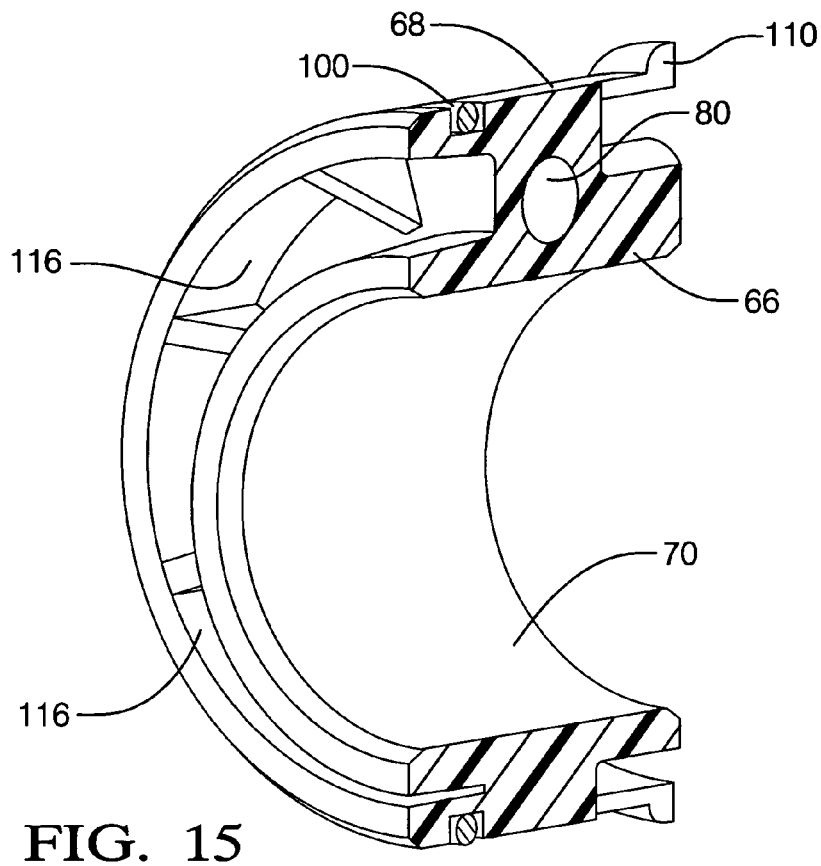
FIG. 15 is a cross-sectional perspective view of the bearing of the fifth embodiment.
Figure 16:
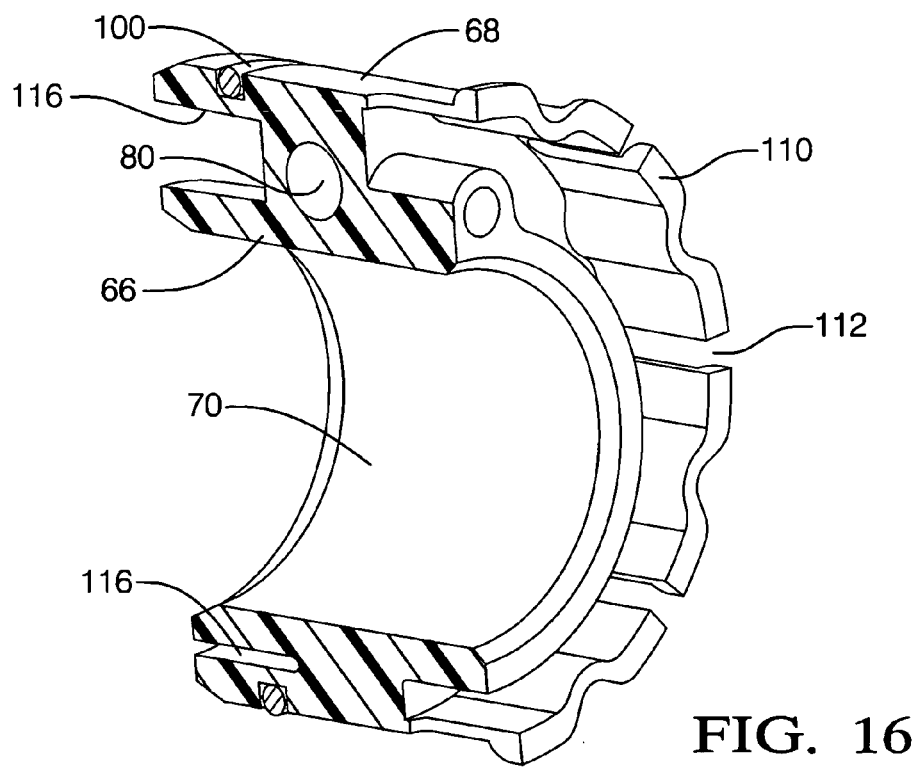
FIG. 16 is another cross-sectional perspective view of the bearing of the fifth embodiment.

Also, referring to FIG. 10, the fastener 86 can further include a seal 103 to retain the fastener 86 relative to the housing 32. In alternative embodiments of the invention, Loctite® or similar methods as are known in the art could optionally be disposed on the threads or tolerance stacking can be employed to retain the fastener 86 relative to the housing 32.

There are several embodiments of the bearing 40 shown in the FIGS. 10-23. Each of the embodiments further illustrates the flexibility and design alternatives to the wall 66 of the bearing 40 to create various bearings 40 each unique to an application, with various widths, scallop 114 designs and cavity 116 arrangements of the wall 66. The alternative embodiment of the bearing 40 in FIG. 10 does not include a scallop 114, however, the fastener 86 utilizes the seal on the fastener 86. The fastener 86 would engage with the aperture 48 of the housing 32 (not shown) to secure the fastener 86 in the apparatus 30.

Referring to FIG. 11, a third embodiment of the bearing 40 includes an increased bearing 40 width that spans and supports a longer portion of the rack 34. The additional bearing 40 width thereby enhances the load carrying capability of the bearing 40 for supporting the rack 34 in meshing engagement with the pinion 36. An additional dampening mechanism 100, an o-ring in this embodiment, is used to provide additional dampening of the lash movements of the rack 34 relative to the pinion 36.

FIG. 12 shows a fourth embodiment of the bearing 40 and includes an adapter 118 that rotatably engages the inner face 70 of the bearing 40. The adapter 118 defines an orifice 120 that has a configuration complementary with a configuration of the rack 34. The adapter 118 is typically used to support a rack 34 having a Y-shaped rack configuration. The fourth embodiment bearing 40 also allows for the inner surface 46 of the housing 32 to be a more simple tube design without the additional machining of the offset second diameter 58, as is known in the art, and discussed above. The adapter 118 is an additional component that is typically required for variable effort power steering apparatus 30 that utilize the Y-shaped rack configuration. Also, as one skilled in the art would recognize the orifice 120 of the adapter 118 could optionally be a configuration complementary to any rack configuration.

FIGS. 13-16 show a fifth embodiment of the bearing 40 that incorporates the cavity 116 extending from the leading end 106 of the bearing 40. However, the fifth embodiment does not include a scallop 114 therefore the bearing 40 would be positioned in the chamber 44 next adjacent the pinion 36.

Figure 17:
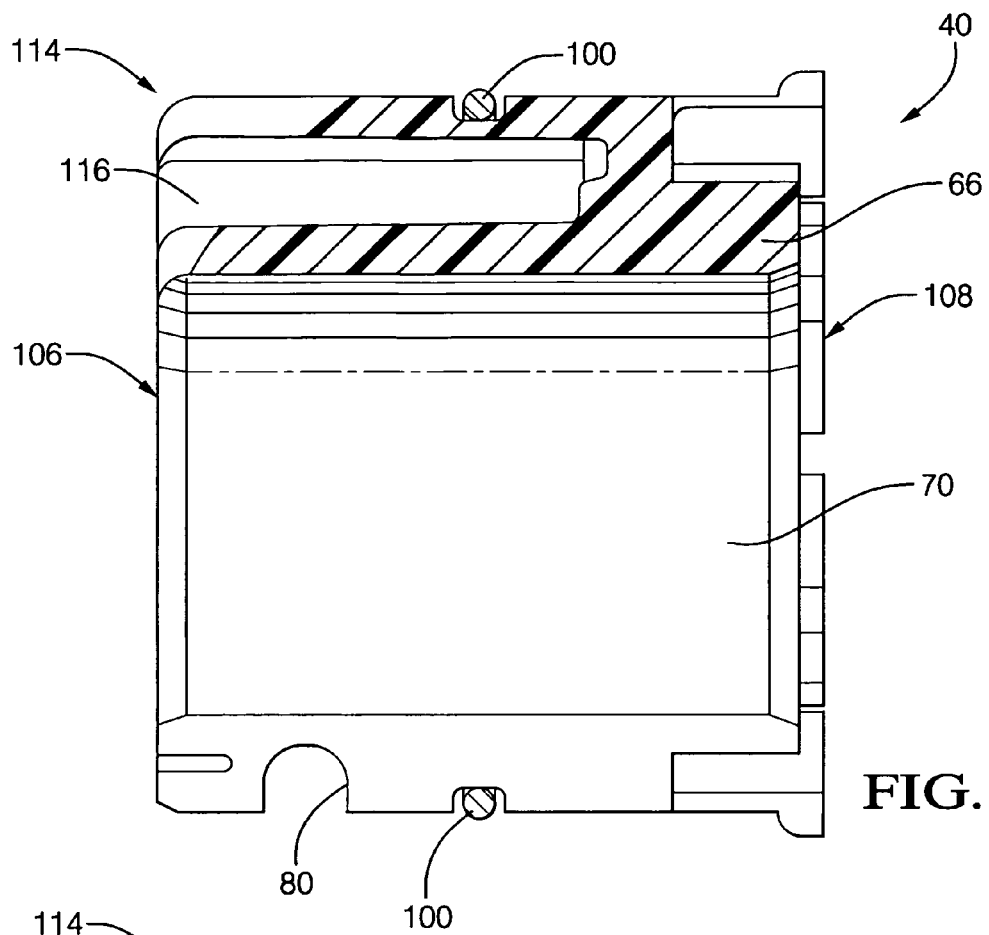
FIG. 17 is a cross-sectional view of a sixth embodiment of the bearing for supporting the rack in meshing engagement with the pinion.
Figure 18:
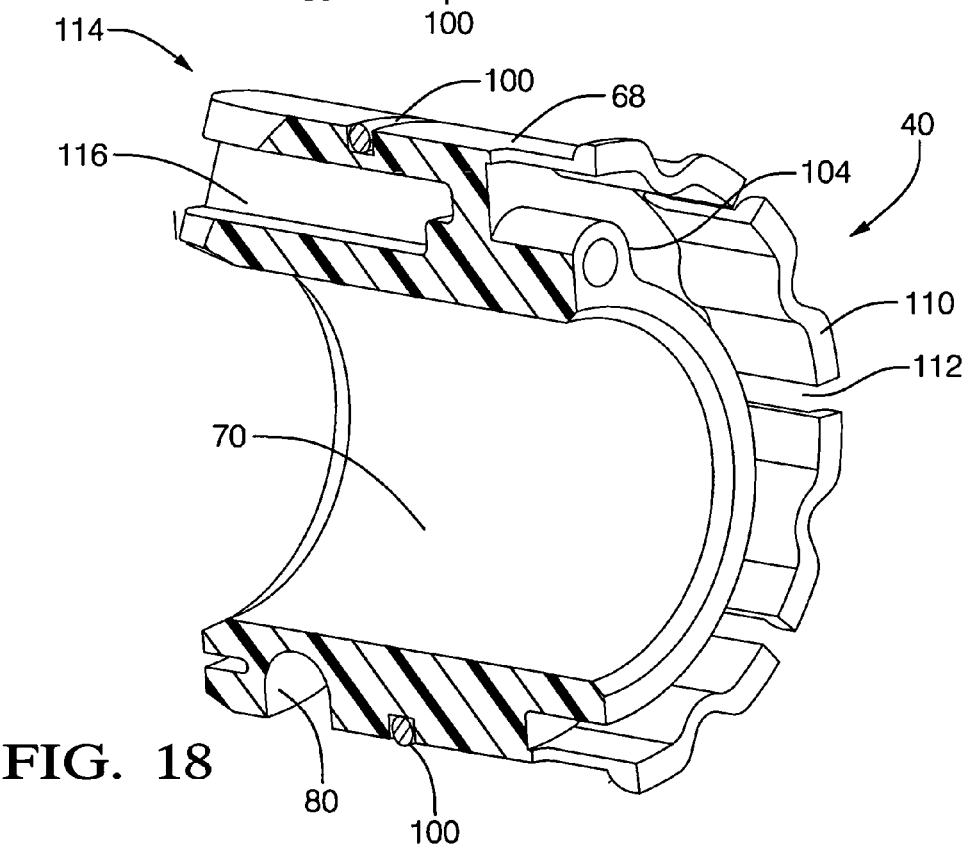
FIG. 18 is a cross-sectional perspective view of the bearing of the sixth embodiment.
Figure 19:
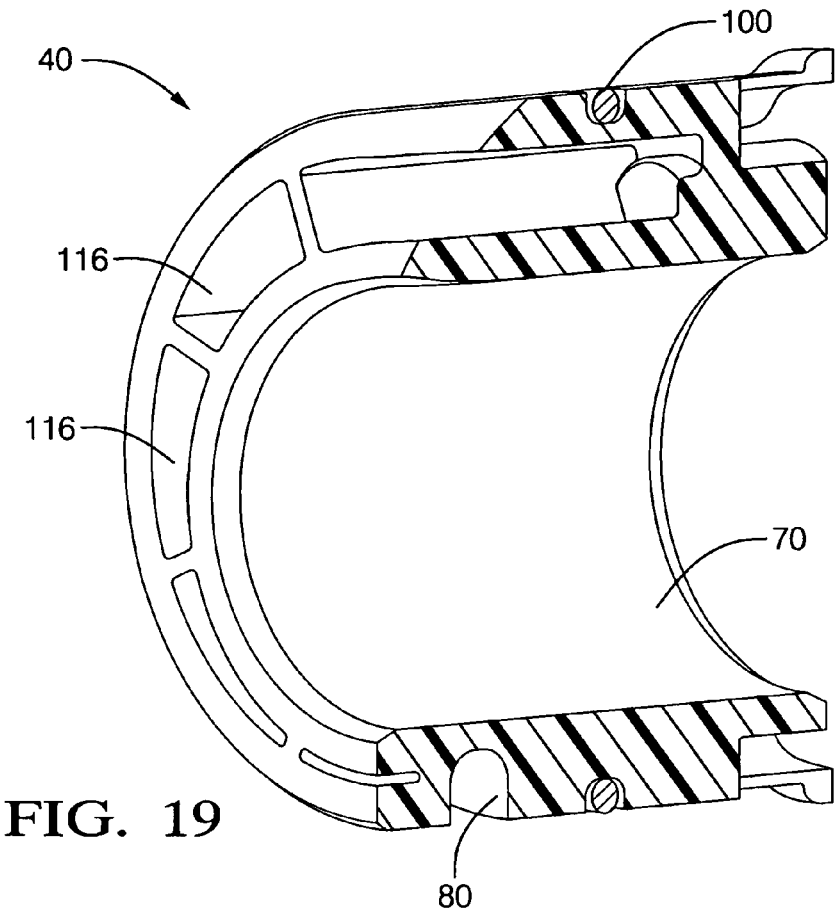
FIG. 19 is another cross-sectional perspective view of the bearing of the sixth embodiment.

FIGS. 17-19 show a sixth embodiment of the bearing 40 that incorporates the cavity 116 circumferentially around the leading end 106. The cavities 116 extend along the longitudinal axis 42 toward the trailing end 108 and are disposed between the outer face 68 and the inner face 70 of the bearing 40. Additionally the bearing 40 includes a scallop 114 in the bearing 40 wall 66.

Figure 20:
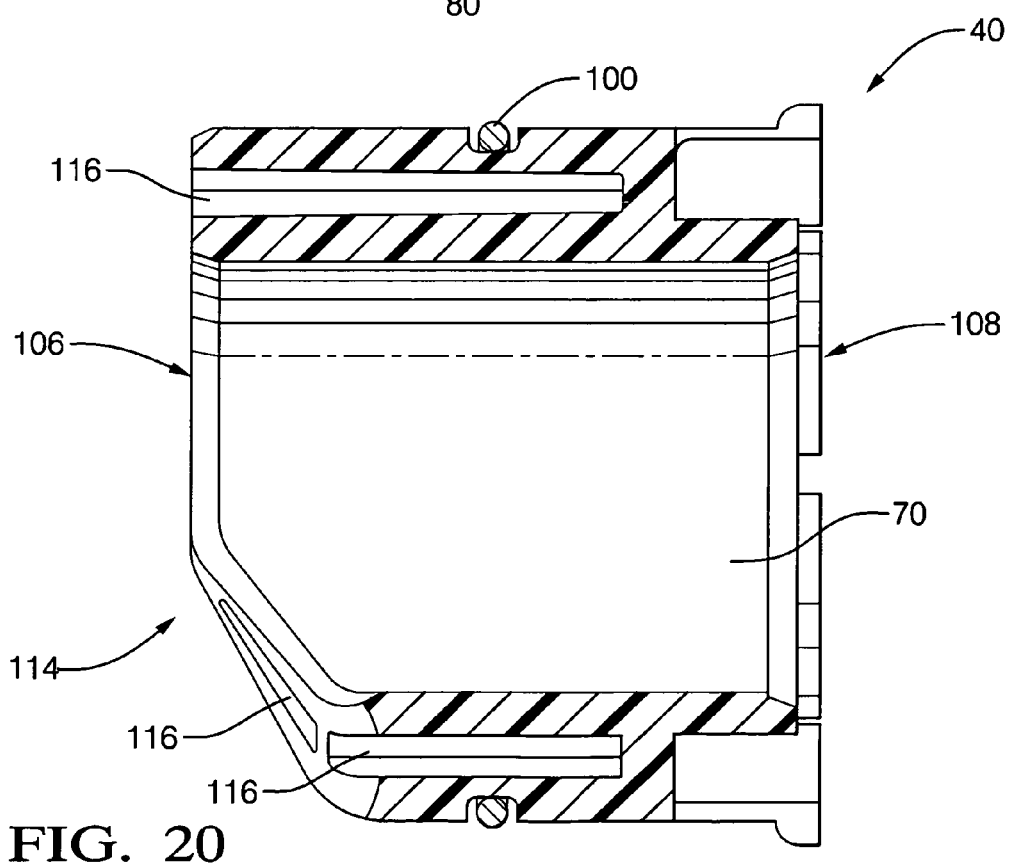
FIG. 20 is a cross-sectional view of a seventh embodiment of the bearing for supporting the rack in meshing engagement with the pinion.
Figure 21:
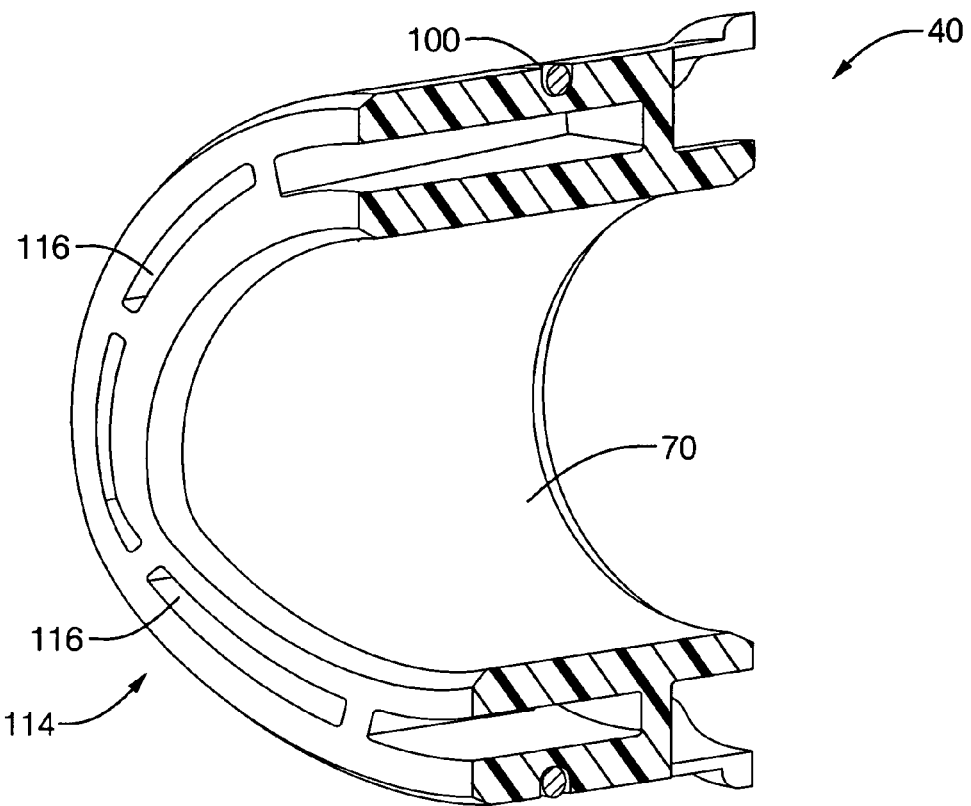
FIG. 21 is a cross-sectional perspective view of the bearing of the seventh embodiment.
Figure 22:
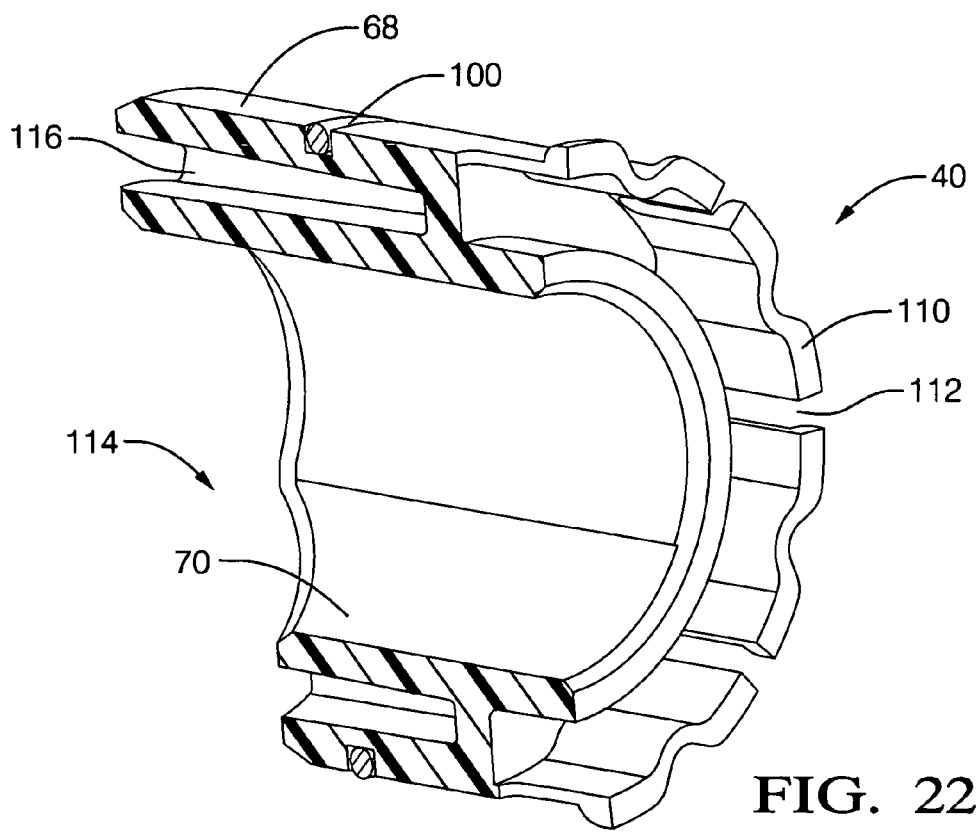
FIG. 22 is another cross-sectional perspective view of the bearing of the seventh embodiment.

FIGS. 20-22 show a seventh embodiment of the bearing 40 incorporating the series of cavities 116 extending from the leading end 106 of the bearing 40 along the longitudinal axis 42 toward the trailing end 108. Additionally a scallop 114 extends a greater length into the wall 66 to narrow the bearing 40 width, which allows the bearing 40 to be positioned so a portion of the wall 66 of the bearing 40 in directly opposing the pinion 36 meshing with the rack 34.

Figure 23:
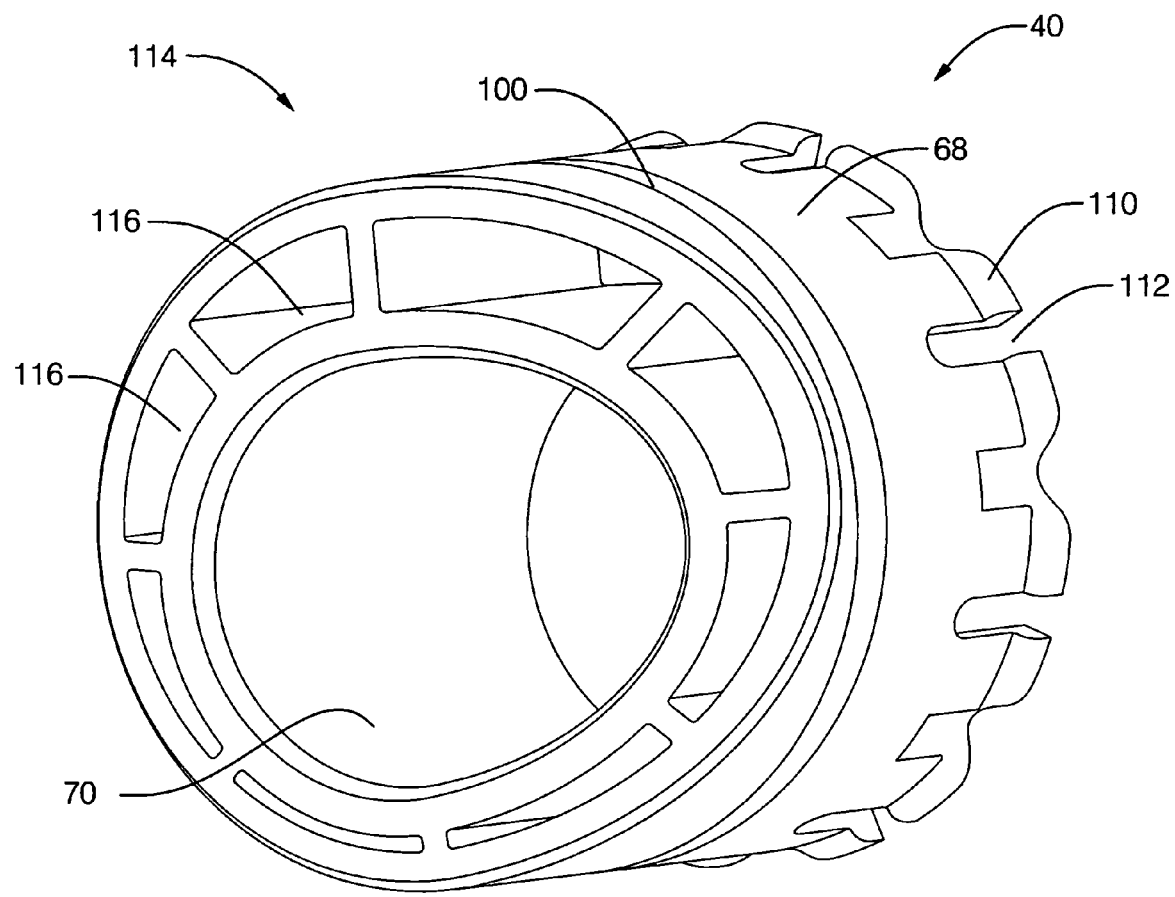
FIG. 23 is a perspective view of an eighth embodiment of the bearing for supporting the rack in meshing engagement with the pinion.

FIG. 23 shows an eighth embodiment of the bearing 40 with the series of cavities 116 extending from the leading end 106 of the bearing 40. In addition the eighth embodiment illustrates a scallop 114 and that the scallop 114 can vary in size and angle to further narrow the bearing 40 width in a portion of the wall 66 of the bearing 40. It is understood by one skilled in the art that the load requirements and design of the housing 32 requires the bearing 40 to be flexible for positioning of the bearing 40 in the housing 32 near the meshing engagement between the rack 34 and pinion 36.

Obviously, many modifications and variations of the present invention are possible in light of the above teachings. The invention may be practiced otherwise than as specifically described within the scope of the appended claims.

What is claimed is:

1. A power steering apparatus, comprising:
   a housing extending along a longitudinal axis and having a chamber with an inner surface;
   a rack disposed within said chamber for movement along said longitudinal axis;
   a pinion supported by said housing and extending into said chamber for meshing with said rack;
   a bearing engaging said inner surface of said chamber and disposed about said rack with said bearing having a wall of a continuous varying radial thickness circumferentially surrounding said rack with said wall defining a hole extending to a distal end defining a seat; and
   an adjustment device supported by said housing and connected to said seat such that said adjustment device is configured to push and pull said bearing for selectively rotatably adjusting said bearing relative to said longitudinal axis in both a clockwise and counter-clockwise rotation thereby moving said rack relative to said pinion for ensuring meshing engagement of said pinion with said rack, said adjustment device including a fastener having a first end defining a bulbous portion, a shaft extending from said first end to a second end for engagement with said housing, and a coil spring disposed around said shaft of said fastener for biasing between said bearing and said inner surface; and
   said inner surface of said housing further having a groove extending annularly around said longitudinal axis, said bearing further having a plurality of fingers disposed circumferentially around said bearing and biasing outward from said bearing for engagement into said groove to position said bearing in said chamber, each finger of said plurality of fingers being equidistant from adjacent fingers and having a notch disposed therebetween, said bearing further having a polymeric dampening mechanism that engages an outer face of said bearing and is spaced away from said plurality of fingers, said polymeric dampening mechanism dampening lash movements between said rack and said pinion.

2. The apparatus as set forth in claim 1 wherein said seat of said bearing is a bulb shaped seat and said bulbous portion at said first end of said fastener is configured to engage said bulb shaped seat.

3. The apparatus as set forth in claim 2 wherein said bulb shaped seat further defines an annular projection with said bulbous portion of said fastener engaging said annular projection.

4. The apparatus as set forth in claim 2 wherein said housing further includes an aperture extending into said chamber for receiving said fastener of said adjustment device.

5. The apparatus as set forth in claim 4 wherein said second end of said fastener further defines a threaded portion for engagement with said aperture of said housing.

6. The apparatus as set forth in claim 1 wherein said wall extends along said longitudinal axis between a leading end and a trailing end with said trailing end defining a stop to limit the movement of said rack in said chamber.

7. The apparatus as set forth in claim 1 wherein said wall of said bearing includes an outer face having an outer radius and an inner face having an inner radius that is off center a distance from said outer radius to define said continuous varying radial thickness of said wall.

8. The apparatus as set forth in claim 1 wherein said wall of said bearing is defined by an outer face defining an external circumference having a first center point and an inner face defining an internal circumference having a second center point and said second center point eccentric from said first center point to define said continuous varying radial thickness of said wall.

9. The apparatus as set forth in claim 8 wherein said continuous varying radial thickness defines a minimum radial thickness where said internal circumference is closest to said external circumference.

10. The apparatus as set forth in claim 1 wherein said wall further defines a bearing width extending between a leading end and a trailing end and said leading end is further defined by at least one scallop extending inward along said longitudinal axis into said wall of said bearing for allowing said bearing to be positioned under said pinion.

11. The apparatus as set forth in claim 1 wherein said wall has a leading end and a trailing end and said trailing end further includes an orientation extension for locating said bearing relative to said housing during the assembly of said bearing into said chamber, said orientation extension being disposed radially inwardly of said plurality of fingers.

12. The apparatus as set forth in claim 1 wherein said wall further defines a bearing width extending between a leading end and a trailing end and said wall further defines a cavity extending along said longitudinal axis from said leading end between said outer and inner faces for improving cure characteristics of said bearing.

13. The apparatus as set forth in claim 1 wherein said adjustment device is coupled to said seat in a ball and socket configuration.

14. The power steering apparatus of claim 1, wherein said polymeric dampening mechanism comprises an o-ring.

15. A power steering apparatus, comprising:
   a housing extending along a longitudinal axis and having a chamber with an inner surface;
   a rack disposed within said chamber for movement along said longitudinal axis;
   a pinion supported by said housing and extending into said chamber for meshing with said rack;
   a bearing engaging said inner surface of said chamber and disposed about said rack with said bearing having a wall of a continuous varying radial thickness circumferentially surrounding said rack with said wall defining a hole extending to a distal end defining a bulb shaped seat; and an adjustment device supported by said housing, said adjustment device having a fastener with a first end defining a bulbous portion and a shaft coupled to the bulbous portion, said bulbous portion being connected to said bulb shaped seat such that said adjustment device is configured to push and pull said bearing to selectively cause rotation of said bearing to move said rack relative to said pinion, said adjustment device further including a coil spring disposed around said shaft of said fastener for biasing between said bearing and said inner surface; and said inner surface of said housing further having a groove extending annularly around said longitudinal axis, said bearing further having a plurality of fingers disposed circumferentially around said bearing and biasing outward from said bearing for engagement into said groove to position said bearing in said chamber, each finger of said plurality of fingers being equidistant from adjacent fingers, said bearing further having a polymeric dampening mechanism that engages an outer face of said bearing and is spaced away from said plurality of fingers, said polymeric dampening mechanism dampening lash movements between said rack and said pinion, said wall having a leading end and a trailing end, said trailing end further includes an orientation extension for locating said bearing relative to said housing which is disposed radially inwardly of said plurality of fingers.

16. The power steering apparatus of claim 15, wherein said polymeric dampening mechanism comprises an o-ring.

17. A power steering apparatus, comprising:

a housing extending along a longitudinal axis and having a chamber with an inner surface;

a rack disposed within said chamber for movement along said longitudinal axis;

a pinion supported by said housing and extending into said chamber for meshing with said rack;

a bearing engaging said inner surface of said chamber and disposed about said rack with said bearing having a wall of a continuous varying radial thickness circumferentially surrounding said rack, said wall defining a hole extending to a distal end defining a seat, said bearing further having a polymeric dampening mechanism that is disposed around an outer face of said bearing that dampens lash movements between said rack and said pinion; and an adjustment device including a shaft supported by said housing and connected to said seat such that said adjustment device is configured to push and pull said bearing for selectively rotatably adjusting said bearing relative to said longitudinal axis in both a clockwise and counter-clockwise rotation thereby moving said rack relative to said pinion for ensuring meshing engagement of said pinion with said rack, said adjustment device further including a coil spring disposed around said shaft for biasing between said bearing and said inner surface.

18. The power steering apparatus of claim 17, wherein said polymeric dampening mechanism comprises an o-ring.

* * * * *